(12) United States Patent
Kansal et al.

(10) Patent No.: US 9,183,571 B2
(45) Date of Patent: *Nov. 10, 2015

(54) SYSTEM AND METHOD FOR PROVIDING ADVERTISEMENT DATA TO A MOBILE COMPUTING DEVICE

(75) Inventors: Sachin S. Kansal, Sunnyvale, CA (US); David D. Daetz, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1442 days.

This patent is subject to a terminal disclaimer.

(21) Appl. No.: 11/901,272

(22) Filed: Sep. 14, 2007

(65) Prior Publication Data

US 2009/0076906 A1 Mar. 19, 2009

(51) Int. Cl.
*H04W 24/00* (2009.01)
*G06Q 30/02* (2012.01)
*H04W 4/00* (2009.01)
*H04M 3/42* (2006.01)
*H04M 3/00* (2006.01)

(52) U.S. Cl.
CPC ............ *G06Q 30/0267* (2013.01); *G06Q 30/02* (2013.01)

(58) Field of Classification Search
CPC ............ G06Q 30/0261; G06Q 10/109; G06Q 30/0255; G06Q 30/0269; G06Q 10/1095; G06Q 30/00; G06Q 30/0201; G06Q 30/0241; G06Q 30/0264; G06Q 10/02; G06Q 10/06314; G06Q 30/0207; G06Q 30/0242
USPC .......................................... 455/456.3; 705/14
See application file for complete search history.

(56) References Cited

U.S. PATENT DOCUMENTS

| | | | |
|---|---|---|---|
| 4,779,081 | A | 10/1988 | Nakayama et al. |
| 4,788,675 | A | 11/1988 | Jones et al. |
| 5,134,719 | A | 7/1992 | Mankovitz |
| 5,303,393 | A | 4/1994 | Noreen et al. |
| 6,000,000 | A | 12/1999 | Hawkins et al. |
| 6,009,409 | A | 12/1999 | Adler et al. |
| 6,011,976 | A | 1/2000 | Michaels et al. |
| 6,073,075 | A | 6/2000 | Kondou et al. |
| 6,108,727 | A | 8/2000 | Boals et al. |
| 6,141,010 | A | 10/2000 | Hoyle |
| 6,157,814 | A | 12/2000 | Hymel et al. |
| 6,182,010 | B1 | 1/2001 | Berstis |
| 6,216,112 | B1 | 4/2001 | Fuller et al. |

(Continued)

FOREIGN PATENT DOCUMENTS

| | | |
|---|---|---|
| DE | 10228608 A1 | 1/2004 |
| EP | 001220552 | 7/2002 |

(Continued)

OTHER PUBLICATIONS

U.S. Appl. No. 12/324,694, filed Nov. 26, 2008, Colligan et al.

(Continued)

*Primary Examiner* — Timothy Pham
(74) *Attorney, Agent, or Firm* — Mahamedi Paradice LLP (57) ABSTRACT

A mobile computing device includes a processor, a display coupled to the processor, a memory coupled to the processor and configured to store user-specific data, and a location-determining circuit configured to determine the location of the portable electronic device. The processor is configured to provide advertisement data on the display based upon the location of the portable electronic device and the user-specific data.

17 Claims, 4 Drawing Sheets

(56) References Cited

U.S. PATENT DOCUMENTS

| | | | |
|---|---|---|---|
| 6,253,326 B1 | 6/2001 | Lincke et al. |
| 6,259,405 B1 | 7/2001 | Stewart et al. |
| 6,300,946 B1 | 10/2001 | Lincke et al. |
| 6,310,955 B1 | 10/2001 | Reeves |
| 6,310,995 B1 | 10/2001 | Saini et al. |
| 6,343,317 B1 | 1/2002 | Glorikian |
| 6,343,318 B1 | 1/2002 | Hawkins et al. |
| 6,359,571 B1 | 3/2002 | Endo et al. |
| 6,360,272 B1 | 3/2002 | Lincke et al. |
| 6,397,246 B1 | 5/2002 | Wolfe |
| 6,397,259 B1 | 5/2002 | Lincke et al. |
| 6,425,087 B1 | 7/2002 | Osborn et al. |
| 6,430,603 B2 | 8/2002 | Hunter |
| 6,452,498 B2 | 9/2002 | Stewart |
| 6,453,371 B1 | 9/2002 | Hampson et al. |
| 6,456,234 B1 | 9/2002 | Johnson |
| 6,457,134 B1 | 9/2002 | Lemke et al. |
| 6,484,033 B2 | 11/2002 | Murray |
| 6,493,327 B1 | 12/2002 | Fingerhut |
| 6,502,033 B1 | 12/2002 | Phuyal |
| 6,523,124 B1 | 2/2003 | Lunsford et al. |
| 6,526,268 B1 | 2/2003 | Marrah et al. |
| 6,529,159 B1 | 3/2003 | Fan et al. |
| 6,545,596 B1 | 4/2003 | Moon |
| 6,546,257 B1 | 4/2003 | Stewart |
| 6,560,640 B2 | 5/2003 | Smethers |
| 6,571,279 B1 | 5/2003 | Herz et al. |
| 6,581,025 B2 | 6/2003 | Lehman |
| 6,590,588 B2 | 7/2003 | Lincke et al. |
| 6,591,288 B1 | 7/2003 | Edwards et al. |
| 6,628,928 B1 | 9/2003 | Crosby et al. |
| 6,647,257 B2 | 11/2003 | Owensby |
| 6,650,902 B1 | 11/2003 | Richton |
| 6,675,165 B1 | 1/2004 | Rothschild |
| 6,675,202 B1 | 1/2004 | Perttunen |
| 6,675,204 B2 | 1/2004 | De Boor et al. |
| 6,694,428 B2 | 2/2004 | Lemke et al. |
| 6,701,521 B1 | 3/2004 | McLlroy et al. |
| 6,772,213 B2 | 8/2004 | Glorikian |
| 6,782,253 B1 | 8/2004 | Shteyn et al. |
| 6,795,710 B1 | 9/2004 | Creemer |
| 6,816,725 B1 | 11/2004 | Lemke et al. |
| 6,820,204 B1 | 11/2004 | Desai et al. |
| 6,829,560 B2 | 12/2004 | Lehman |
| 6,847,969 B1 | 1/2005 | Mathai et al. |
| 6,871,140 B1 | 3/2005 | Florance et al. |
| 6,880,048 B1 | 4/2005 | Lemke |
| 6,917,976 B1 | 7/2005 | Slaughter et al. |
| 6,944,443 B2 | 9/2005 | Bates et al. |
| 6,961,567 B1 | 11/2005 | Kuhn |
| 7,024,464 B1 | 4/2006 | Lusher et al. |
| 7,089,264 B1 | 8/2006 | Guido et al. |
| 7,103,370 B1 | 9/2006 | Creemer |
| 7,266,379 B2 | 9/2007 | Blight et al. |
| 7,313,810 B1 | 12/2007 | Bell et al. |
| 7,343,564 B2 | 3/2008 | Othmer |
| 7,360,248 B1 | 4/2008 | Kanevsky et al. |
| 7,424,447 B2 | 9/2008 | Fuzell-Casey et al. |
| 7,536,190 B1 | 5/2009 | Creemer |
| 7,720,432 B1 | 5/2010 | Colby et al. |
| 7,873,372 B2 | 1/2011 | Creemer |
| 2001/0032121 A1 | 10/2001 | Le |
| 2001/0044310 A1 | 11/2001 | Lincke |
| 2001/0047272 A1 | 11/2001 | Frietas et al. |
| 2002/0052781 A1 | 5/2002 | Aufricht et al. |
| 2002/0069093 A1 | 6/2002 | Stanfield |
| 2002/0077083 A1* | 6/2002 | Zellner et al. ............... 455/414 |
| 2002/0077084 A1 | 6/2002 | Zellner et al. |
| 2002/0077118 A1 | 6/2002 | Zellner et al. |
| 2002/0087401 A1* | 7/2002 | Leapman et al. ............. 705/14 |
| 2002/0103693 A1 | 8/2002 | Bayer et al. |
| 2002/0164962 A1 | 11/2002 | Mankins et al. |
| 2003/0008661 A1 | 1/2003 | Joyce et al. |
| 2003/0046304 A1* | 3/2003 | Peskin et al. ............. 707/104.1 |
| 2003/0050046 A1 | 3/2003 | Conneely et al. |
| 2003/0060211 A1 | 3/2003 | Chern et al. |
| 2003/0060214 A1 | 3/2003 | Hendrey et al. |
| 2003/0159109 A1 | 8/2003 | Rossmann et al. |
| 2004/0127198 A1 | 7/2004 | Roskind et al. |
| 2004/0137886 A1* | 7/2004 | Ross ................. G06Q 30/02 455/414.1 |
| 2005/0245241 A1 | 11/2005 | Durand et al. |
| 2006/0030306 A1 | 2/2006 | Kuhn |
| 2006/0036490 A1* | 2/2006 | Sagalyn ..................... 705/14 |
| 2006/0041472 A1 | 2/2006 | Lukose et al. |
| 2006/0143083 A1 | 6/2006 | Wedeen |
| 2006/0149677 A1* | 7/2006 | Shahine et al. ............ 705/50 |
| 2006/0197781 A1 | 9/2006 | Arutunian |
| 2006/0200308 A1 | 9/2006 | Arutunian |
| 2006/0200311 A1 | 9/2006 | Arutunian et al. |
| 2006/0200382 A1 | 9/2006 | Arutunian et al. |
| 2006/0200383 A1 | 9/2006 | Arutunian et al. |
| 2006/0200384 A1 | 9/2006 | Arutunian et al. |
| 2006/0293065 A1* | 12/2006 | Chew ................ G06Q 30/02 455/456.3 |
| 2007/0055561 A1* | 3/2007 | Perrella et al. .............. 705/9 |
| 2007/0093258 A1* | 4/2007 | Steenstra et al. ........ 455/456.5 |
| 2007/0178899 A1 | 8/2007 | Kuhn |
| 2007/0204301 A1* | 8/2007 | Benson ............... G06Q 30/00 725/46 |
| 2007/0263863 A1 | 11/2007 | Sakhpara |
| 2007/0271234 A1 | 11/2007 | Ravikiran |
| 2008/0004954 A1* | 1/2008 | Horvitz ..................... 705/14 |
| 2008/0019531 A1 | 1/2008 | Kimijima |
| 2008/0052421 A1 | 2/2008 | Wang et al. |
| 2008/0059285 A1 | 3/2008 | Hamoui |
| 2008/0082651 A1* | 4/2008 | Singh et al. ............... 709/224 |
| 2008/0098420 A1* | 4/2008 | Khivesara et al. ........... 725/32 |
| 2008/0132219 A1 | 6/2008 | Bisdikian et al. |
| 2008/0160966 A1 | 7/2008 | Mckiou et al. |
| 2008/0195312 A1* | 8/2008 | Aaron et al. ............... 701/209 |
| 2008/0195457 A1* | 8/2008 | Sherman et al. ............ 705/10 |
| 2009/0006194 A1* | 1/2009 | Sridharan ........... G06Q 30/02 705/14.62 |
| 2009/0076906 A1 | 3/2009 | Kansal et al. |
| 2010/0130179 A1 | 5/2010 | Colligan et al. |
| 2011/0171976 A1 | 7/2011 | Creemer |

FOREIGN PATENT DOCUMENTS

| | | |
|---|---|---|
| EP | 1551193 A1 | 7/2005 |
| EP | 1063837 B1 | 10/2005 |
| EP | 1 631 050 | 6/2007 |
| WO | WO99/55066 A1 | 10/1999 |
| WO | WO01/65411 A1 | 9/2001 |
| WO | WO 2005-071932 A1 | 8/2005 |
| WO | WO 2006/099586 | 9/2006 |

OTHER PUBLICATIONS

U.S. Appl. No. 12/324,678, filed Nov. 26, 2008, Colligan et al.
U.S. Appl. No. 11/449,001, filed Jun. 6, 2006, Creemer.
U.S. Appl. No. 61/140,562, filed Dec. 23, 2008, Colligan et al.
U.S. Appl. No. 60/954,022, filed Aug. 6, 2007, Swift et al.
International Search Report for International Application No. PCT/US2001/06340; date mailed May 16, 2001; 1 page.
Office Action for U.S. Appl. No. 11/540,909, date mailed Nov. 17, 2008, 14 pages.
Office Action for U.S. Appl. No. 11/809,198, date mailed Oct. 24, 2008, 15 pages.
Protest for U.S. Appl. No. 09/794,082, filed Feb. 24, 2004, 5 pages.
Response to Office Action for U.S. Appl. No. 11/540,909, date mailed Apr. 16, 2009, 10 pages.
Response to Office Action for U.S. Appl. No. 11/809,198, date mailed Feb. 17, 2009, 11 pages.
International Search Report and Written Opinion for International Application No. PCT/US2009/064940, mail date May 13, 2010, 8 pages.
Office Action for U.S. Appl. No. 09/794,082, mail date May 16, 2008, 10 pages.

(56) References Cited

OTHER PUBLICATIONS

Office Action for U.S. Appl. No. 09/794,082, mail date Jan. 14, 2009, 9 pages.
Office Action for U.S. Appl. No. 09/794,082, mail date Jun. 25, 2009, 8 pages.
Office Action for U.S. Appl. No. 12/420,743, mail date May 7, 2010, 9 pages.
Office Action for U.S. Appl. No. 11/634,328, mail date Jun. 23, 2009; 8 pages.
International Search Report and Written Opinion for International Application No. PCT/US2009/068525, mail date Aug. 5, 2010, 8 pages.
Office Action for U.S. Appl. No. 12/324,694, mail date Aug. 5, 2010, 10 pages.

\* cited by examiner

SYSTEM AND METHOD FOR PROVIDING ADVERTISEMENT DATA TO A MOBILE COMPUTING DEVICE

BACKGROUND

The present invention relates generally to the field of mobile computing devices, and more specifically, to systems and methods for providing advertisement data to a mobile computing device.

Mobile devices may be used to provide location-based advertisements to users of mobile devices. As a user travels, advertisements may be displayed on a mobile device the user is carrying based upon the geographic location of the mobile device. For example, if a user walks past a restaurant, an advertisement (e.g., coupon, discount, general advertisement, etc.) may be displayed on the user's mobile device.

However, with the increasing usage of mobile devices and location-based advertisements, users may receive numerous advertisements, where many may be totally irrelevant to the user, and where it may be difficult to identify relevant or useful advertisements because of the high number of advertisements being received.

BRIEF DESCRIPTION

DETAILED DESCRIPTION

Disclosed is a system and method for providing location-based advertisements using a mobile computing device. In some embodiments, the advertisement data is based upon both the location of the mobile computing device and user-specific data stored on or retrievable by the mobile computing device.

Figure 1:
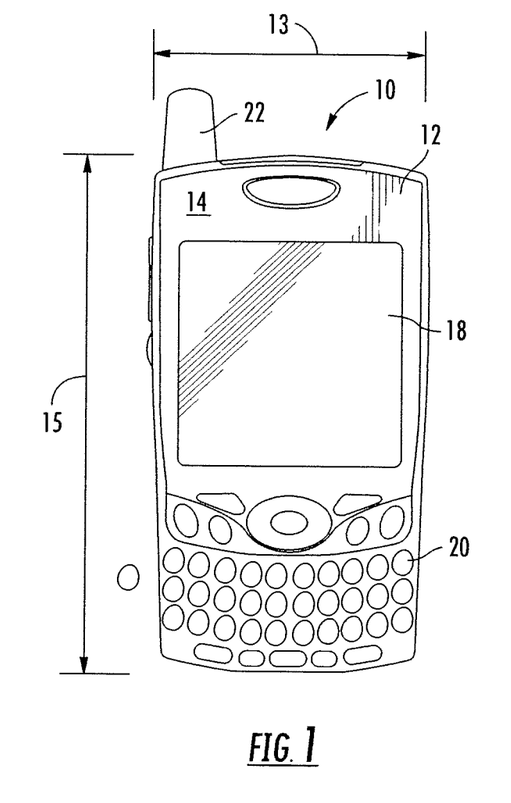
FIG. 1 is a front view of a mobile computing device according to an exemplary embodiment.
Figures 2, 3:
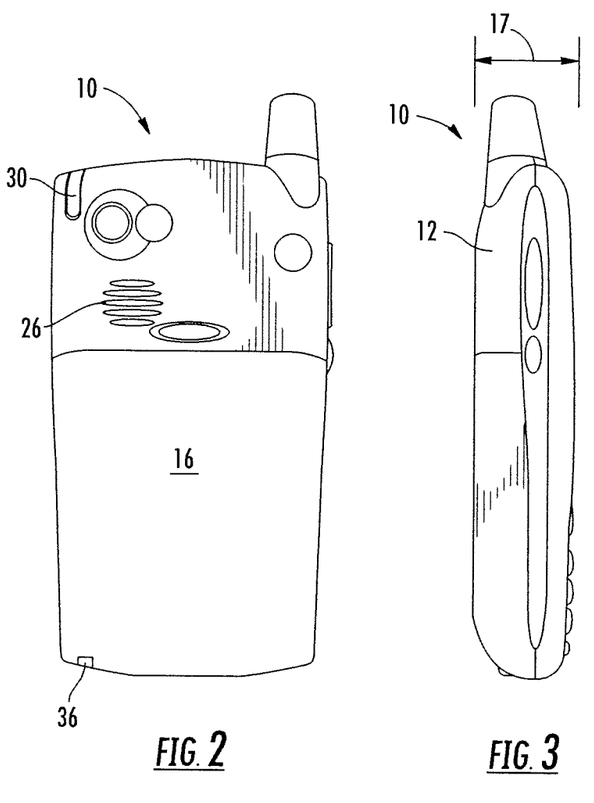
FIG. 2 is a back view of the mobile computing device of FIG. 1 according to an exemplary embodiment.
FIG. 3 is a side view of the mobile computing device of FIG. 1 according to an exemplary embodiment.

Referring to FIGS. 1-3, a mobile computing device 10 is shown. The teachings herein can be applied to device 10 or to other electronic devices (e.g., a desktop computer), mobile computing devices (e.g., a laptop computer) or handheld computing devices, such as a personal digital assistant (PDA), smartphone, mobile telephone, personal navigation device, etc. According to one embodiment, device 10 is a smartphone, which is a combination mobile telephone and handheld computer having PDA functionality. PDA functionality can comprise one or more of personal information management (e.g., including personal data applications such as email, calendar, phone, text messaging, etc.), database functions, word processing, spreadsheets, voice memo recording, Global Positioning System (GPS) functionality, etc. Device 10 is configured to synchronize personal information from these applications with a computer (e.g., a desktop, laptop, server, etc.). Device 10 is further configured to receive and operate additional applications provided to device 10 after manufacture, e.g., via wired or wireless download, SecureDigital card, etc.

As shown in FIGS. 1-3, device 10 includes a housing 12 and a front side 14 and a back side 16. Device 10 further comprises a display 18 and a user input device 20 (e.g., a QWERTY keyboard, buttons, touch screen, speech recognition engine, etc.). Display 18 can comprise a touch screen display in order to provide user input to a processor 40 (see FIG. 4) to control functions, such as to select options displayed on display 18, enter text input to device 10, or enter other types of input. Display 18 also provides images (see, e.g., FIG. 6) that are displayed and may be viewed by users of device 10. User input device 20 can provide similar inputs as those of touch screen display 18. Device 10 can further comprise a speaker 26, and a stylus 30 to assist the user in making selections on display 18.

According to an exemplary embodiment, housing 12 is configured to hold a screen such as display 18 in a fixed relationship above a user input device such as user input device 20 in a substantially parallel or same plane. This fixed relationship excludes a hinged or movable relationship between the screen and the user input device (e.g., a plurality of keys) in the fixed embodiment. Device 10 may be a handheld computer, which is a computer small enough to be carried in a hand of a user, comprising such devices as typical mobile telephones and personal digital assistants, but excluding typical laptop computers and tablet PCs.

In various embodiments, housing 12 could be any size, shape, and dimension. In some embodiments, housing 12 has a width 13 of no more than about 200 mm or, alternatively, no more than about 100 mm. According to some of these embodiments, housing 12 has a width 13 of no more than about 85 mm or, alternatively, no more than about 65 mm. According to some embodiments, housing 12 has a width 13 of at least about 30 mm or, alternatively, at least about 50 mm. According to some of these embodiments, housing 12 has a width 13 of at least about 55 mm.

In some embodiments, housing 12 has a length 15 of no more than about 200 mm or, alternatively, no more than about 150 mm. According to some of these embodiments, housing 12 has a length 15 of no more than about 135 mm or, alternatively, no more than about 125 mm. According to some embodiments, housing 12 has a length 15 of at least about 70 mm or, alternatively, at least about 100 mm. According to some of these embodiments, housing 12 has a length 15 of at least about 100 mm.

In some embodiments, housing 12 has a thickness 17 of no more than about 150 mm or, alternatively, no more than about 50 mm. According to some of these embodiments, housing 12 has a thickness 17 of no more than about 30 mm or, alternatively, no more than about 25 mm. According to some embodiments, housing 12 has a thickness 17 of at least about 10 mm or, alternatively, at least about 15 mm. According to some of these embodiments, housing 12 has a thickness 17 of at least about 50 mm.

In some embodiments, housing 12 has a volume of up to about 2500 cubic centimeters or, alternatively, up to about 1500 cubic centimeters. In some alternative embodiments, housing 12 has a volume of up to about 1000 cubic centimeters or, alternatively, up to about 600 cubic centimeters.

Figure 4:
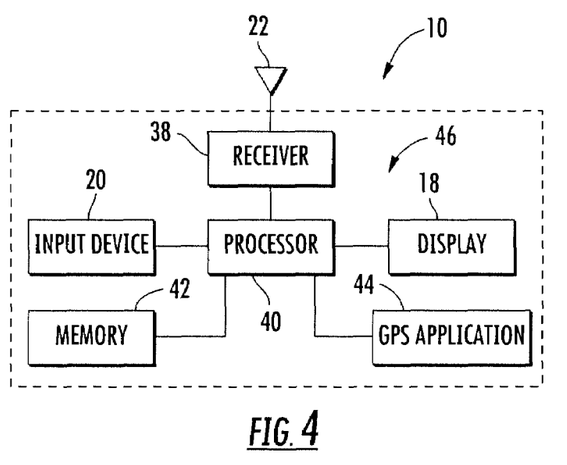
FIG. 4 is a block diagram of the mobile computing device of FIG. 1 according to an exemplary embodiment.

Referring now to FIG. 4, device 10 comprises a processing circuit 46 comprising a processor 40. Processor 40 can comprise one or more microprocessors, microcontrollers, and other analog and/or digital circuit components configured to perform the functions described herein. Processor 40 may comprise one or more memories (e.g., random access memory, read only memory, flash, etc.) configured to store software applications provided during manufacture or subsequent to manufacture by the user or by a distributor of device 10. In one embodiment, processor 40 can comprise a first applications microprocessor configured to run a variety of personal information management applications, such as email, a calendar, contacts, etc., and a second, radio processor on a separate chip or as part of a dual-core chip with the application processor. The radio processor is configured to operate telephony functionality. Device 10 can be configured for cellular radio telephone communication, such as Code Division Multiple Access (CDMA), Global System for Mobile Communications (GSM), Third Generation (3G) systems such as Wide-Band CDMA (WCDMA), or other cellular radio telephone technologies. Device 10 can further be configured for data communication functionality, for example, via GSM with General Packet Radio Service (GPRS) systems (GSM/GPRS), CDMA/1XRTT systems, Enhanced Data Rates for Global Evolution (EDGE) systems, Evolution Data Only or Evolution Data Optimized (EV-DO), and/or other data communication technologies.

Device 10 comprises a receiver 38 which comprises analog and/or digital electrical components configured to receive and transmit wireless signals via antenna 22 to provide cellular telephone and/or data communications with a fixed wireless access point, such as a cellular telephone tower, in conjunction with a network carrier, such as, Verizon Wireless, Sprint, etc. Device 10 can further comprise circuitry to provide communication over a local area network, such as Ethernet or according to an IEEE 802.11x standard or a personal area network, such as a Bluetooth or infrared communication technology.

Device 10 further comprises a microphone 36 (see FIG. 2) configured to receive audio signals, such as voice signals, from a user or other person in the vicinity of device 10, typically by way of spoken words. Alternatively or in addition, processor 40 can further be configured to provide video conferencing capabilities by displaying on display 18 video from a remote participant to a video conference, by providing a video camera on device 10 for providing images to the remote participant, by providing text messaging, two-way audio streaming in full- and/or half-duplex mode, etc.

Device 10 further comprises a location determining application, shown in FIG. 3 as GPS application 44. GPS application 44 can communicate with and provide the location of device 10 at any given time. Device 10 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), and so forth.

Device 10 may be arranged to operate in one or more location determination modes including, for example, a standalone mode, a mobile station (MS) assisted mode, and/or an MS-based mode. In a standalone mode, such as a standalone GPS mode, device 10 may be arranged to autonomously determine its location without real-time network interaction or support. When operating in an MS-assisted mode or an MS-based mode, however, device 10 may be arranged to communicate over a radio access network (e.g., UMTS radio access network) with a location determination entity such as a location proxy server (LPS) and/or a mobile positioning center (MPC).

Figure 5:
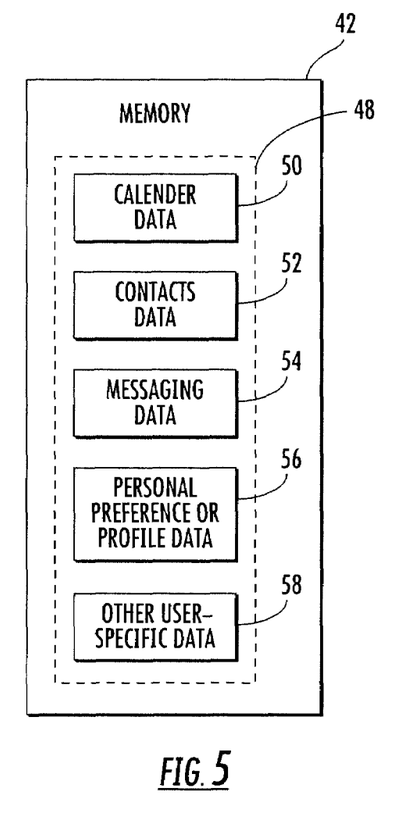
FIG. 5 is a block diagram showing a memory of the mobile computing device of FIG. 1 according to an exemplary embodiment.

Device 10 further comprises a memory 42 coupled to or as part of processor 40. Memory 42 may store a variety of information, data, applications, files, etc. that may be used or accessed using device 10. According to an exemplary embodiment as shown in FIG. 5, memory 42 may store user-specific data 48 (e.g., user profile data, user preference data, user-related data, personal information management data, etc.). User-specific data may include a number of different types of data related to a user of device 10. For example, as shown in FIG. 5, user-specific data 48 may include calendar data 50, contacts data 52, messaging data 54, personal preferences or profile data 56, and other user-specific data 58.

According to an exemplary embodiment, calendar data 50 may include various data related to an electronic calendar application capable of being run on device 10. For example, calendar data 50 may include data regarding various appointments such as location data (e.g., an individual's residence, a commercial establishment, an address or other geographic indicator such as a city, state, etc., a conference room number, and so on), time/date data (e.g., a date and/or time for a specific appointment, data regarding a recurring appointment, etc.), attendee data, and other data related to an appoint or meeting. According to an exemplary embodiment, calendar data 50 may include, for example, a name of an individual or commercial establishment that may be used to determine an associated geographic location (e.g., by looking up the name in a contacts application). According to various other exemplary embodiments, calendar data 50 may include a variety of other types of data, information, and so on.

According to an exemplary embodiment, contacts data 52 may include information regarding specific contacts, such as names, addresses, phone numbers, email addresses, fax numbers, and contact-specific notes (e.g., notes about the specific contact such as a birthday, anniversary, etc.). Processor 40 may utilize contacts data 52 to look-up various types of data (e.g., to determine an address when only a name is known, etc.). According to various other exemplary embodiments, contacts data 52 may include a variety of other types of data, information, and so on.

According to an exemplary embodiment, messaging data 54 may include information related to a variety of messaging applications including email, text messaging, short message service (SMS), and so on. For example, messaging data may include the content of an email, a text message, etc., email addresses, text messaging addresses, etc., and so on. According to various other exemplary embodiments, messaging data 54 may include a variety of other types of data, information, and so on.

According to an exemplary embodiment, personal preference or personal profile data 56 may include data that is specific to a user. Personal preference data 56 may be data that a user may customize by providing input to device 10. For example, device 10 may permit a user to set up a profile (e.g., by filling out an electronic form, answering a set of predetermined questions, providing key words, etc.) for himself or herself that identifies certain likes, dislikes, etc., such as favorite foods, favorite destinations, favorite sports, and so on (including least favorite preferences). As discussed in more detail below, this data may be accessed by processor 40 to filter advertisement data that is being directed to a user from various advertisement services, such that the relevancy of the advertisement data provided to the user, and therefore the usefulness of the advertisement data to the user, is improved. According to various alternative exemplary embodiments, personal preference data 56 may include a variety of other types of data, information, and so on, in addition to that disclosed herein. Furthermore, processor 40 may permit a user to update, customize, reconfigure, etc. personal preference data 56.

According to an exemplary embodiment, personal preference data 56 may further include parameters that define the number, type, frequency, etc. of the advertisement data that is delivered to device 10. For example, a user may indicate that they do not wish to receive any advertisement data (e.g., for a certain period of time), or the user may wish to limit the amount of advertisement data received (e.g., 2 ads per hour, 5 ads per day, etc.) or the type of advertisement data received (e.g., a user may indicate that they do not wish to receive pop-up ads or other type of ads). In a further exemplary embodiment, processor 40 may store any undelivered advertisement data that may later be accessed by a user (e.g., processor 40 may store all pop-up ads in a designated file or application that a user may access at their convenience). Other personal preference data 56 may be provided according to various other exemplary embodiments in order to further define and/or restrict the delivery of advertisement data to device 10.

According to various other exemplary embodiments, device 10 may utilize other data 58 as user-specific data 48 in accordance with the various embodiments disclosed herein. It should be understood that the various types of user-specific data 48 described herein are provided for purposes of illustration, and not limitation, and user-specific data 48 may include other data 58 not specifically addressed herein depending on the specific embodiment (e.g., data related to web-sites the user has visited using device 10, bookmarks or favorites for web-sites, data downloaded from a user's social networking account on a web-site (e.g., a MySpace or Facebook account), data related to audio and/or video clips (e.g., songs, videos, etc.), to-do lists, memo applications, gaming applications, etc.). The present disclosure is intended to be applicable to all such embodiments.

Figure 6:
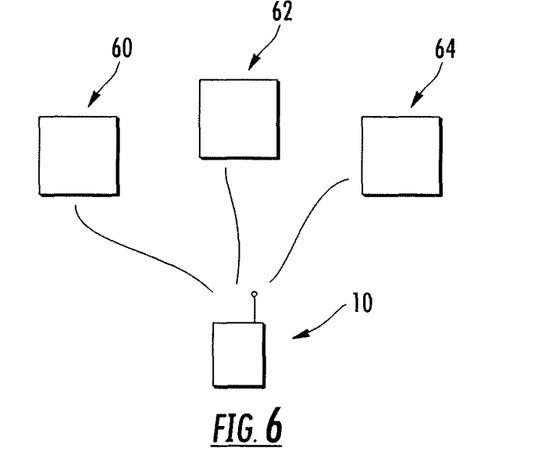
FIG. 6 is a schematic representation of the mobile computing device of FIG. 1 in communication with a number of advertisement services according to an exemplary embodiment.

Referring to FIG. 6, device 10 is shown in communication with a number of advertisement services 60, 62, 64 according to an exemplary embodiment. Services 60, 62, 64 are located remotely from device 10 and are capable of wired and/or wireless communications with device 10. According to an exemplary embodiment, services 60, 62, 64 are configured to provide advertisement data to various types of computing devices, including device 10. Device 10 may communicate with services 60, 62, 64 while the location of device 10 changes (e.g., while a user of device 10 is walking, driving, traveling, etc.) such that the advertisement data may be provided based on the current location of device 10.

According to various exemplary embodiments, the advertisement data may include a variety of information and be provided in a variety of ways. For example, advertisement data may be provided to a user of device 10 in the form of a visual image provided on display 18. For example, an icon (see, e.g., FIG. 9) may be displayed on device 10 and may be selected by a user to provide an enlarged advertisement such as an electronic coupon, etc. (see, e.g., FIG. 10). Alternatively, rather than providing a visual display, device 10 may provide an audible message (e.g., a recording of an advertisement, etc.). Furthermore, the advertisement data may be provided on display 18 and superimposed over another image, such as the current image the user is viewing, a geographic map indicating the location of the establishment(s) the advertisement data is associated with (see FIG. 11), and so on. According to various other exemplary embodiments, other types of advertisement data may be provided to device 10 (e.g., text, graphics, audio data, video data, etc.).

Figure 7:
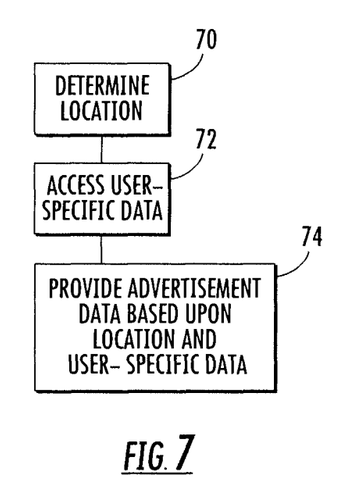
FIG. 7 is a flowchart illustrating a method of providing advertisement data according to an exemplary embodiment.

Referring to FIG. 7, a flow chart illustrating an exemplary method of providing advertisement data to a device such as device 10 is shown. Device 10 first determines its location using GPS application 44 or another suitable location-determining application (step 70). Processor 40 then accesses user-specific data 48 (step 72). Accessing user-specific data 48 may include a variety of actions, including accessing any of calendar data 50, contacts data 52, messaging data 54, personal preference data 56, and/or other user-specific data 58. Processor 40 communicates with advertisement services 60, 62, 64 and, based upon the location of device 10 and user-specific data 48, processor 40 provides advertisement data from one or more of advertisement services 60, 62, 64 to the user.

Figure 9:
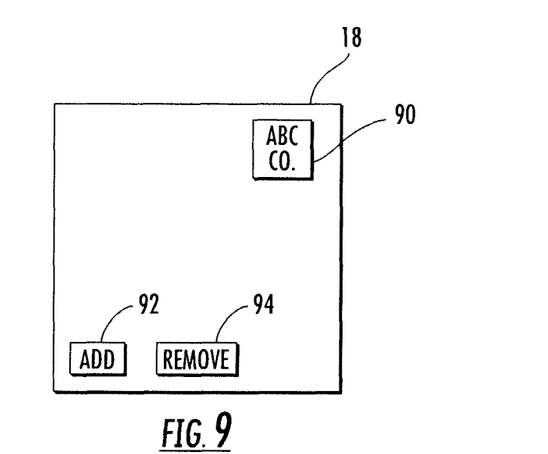
FIGS. 9-11 are schematic representations of a display of the mobile computing device of FIG. 1 according to various exemplary embodiments.
Figure 10:
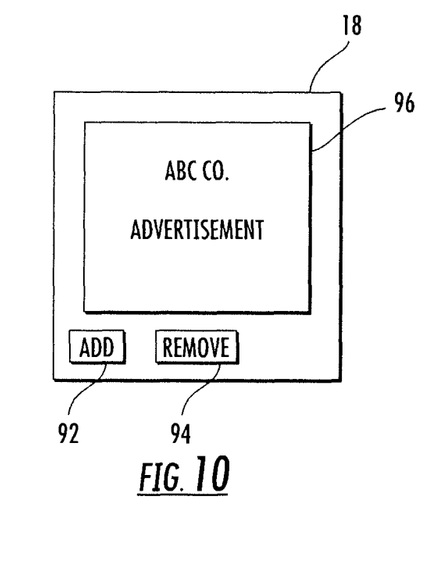

For example, referring to FIGS. 7, 9, and 10, a user may be walking down a street having a variety of restaurants while carrying device 10. Device 10 is configured to determine its location using GPS application 44 and determine that advertisement services 60, 62, 64 have advertisements or advertisement data associated with the nearby restaurants. Processor 40 is configured to access user-specific data 48 and filter the advertisement data accordingly. For example, processor 40 may access messaging data 54 and parse the text of recent emails (or text messages, etc.) to determine whether there are key words, etc., that indicate a common theme, such as "sports," "pizza," etc., such that these key words may be used to select, for example, the restaurants that the user would most likely prefer (e.g., a sports bar, a pizza restaurant, etc.). Similarly, processor 40 may access personal preference data 56, which may include information related to a user's favorite restaurants, etc. Furthermore, processor 40 may access contacts data 52 to, for example, identify any commercial establishments that are in the user's contacts application, are nearby the user's current location, and are offering advertisement data. Further yet, processor 40 may retrieve phone numbers of recently placed and/or received calls and, in conjunction with contacts data 52, determine an address based on the phone number(s). Processor 40 may then determine whether the address(es) represent(s) any commercial establishments that offer advertisement data and are nearby the user. According to various exemplary embodiments, processor 40 may access one or more types of user-specific data 48 to provide a more or less rigorous filtering mechanism for providing advertisement data to device 10.

Referring to FIG. 9 the advertisement data may be provided as an icon 90 that is selectable by the user of device 10 such that upon selection by a user, a larger image is provided, such as image 96 shown in FIG. 10. As shown in FIGS. 9 and 10, "Add" and "Remove" buttons 92, 94 may be provided (e.g., as "soft buttons" on a display or touch screen) that permit a user to indicate whether to permit future advertisement data from the associated establishment, etc. to be provided on device 10 (e.g., by selecting "Remove," processor 40 may filter out advertisement data from advertisement services 60, 62, 64 such that the user does not receive advertisement data from the establishment associated with the current advertisement in the future). The use of buttons 92, 94 may further be used by processor 40 to, for example, modify personal preference data 56.

Figure 8:
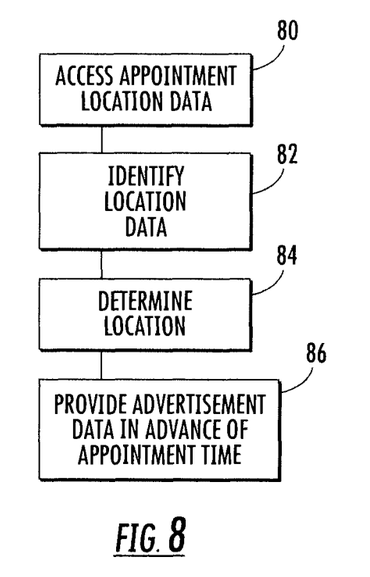
FIG. 8 is a flowchart illustrating a method of providing advertisement data according to another exemplary embodiment.

Referring to FIG. 8, a flow chart illustrating another exemplary method of providing advertisement data to a device such as device 10 is shown. As shown in FIG. 8, processor 40 accesses appointment data stored as a part of, for example, calendar data 50 (e.g., a date, time, and/or location for a future appointment of a user of device 10) (step 80). According to an exemplary embodiment, processor 40 accesses calendar data 50 without being prompted by a user by identifying the date and time of the appointment (e.g., by identifying any appointments in the next 2 hours, 1 day, next week, etc.) and accessing the data at a predetermined period of time prior to the appointment. According to another exemplary embodiment, a user may select a specific appointment the user wishes processor 40 to act upon (e.g., for planning purposes, etc.).

Processor 40 then identifies the location data (e.g., an address, a city, etc.) associated with the appointment (step 82). According to an exemplary embodiment, processor 40 may determine the location data for the appointment by parsing the text of a calendar entry (e.g., "Meeting at Joe's Restaurant") and referencing contacts data 52 to determine whether there is an address associated with "Joe's Restaurant" in contacts data 52. Alternatively, an address may be provided directly in the appointment data, which processor 40 may then use as the location data for the appointment. Further, a user may be prompted for or manually input the location data for an appointment if processor 40 cannot otherwise determine the location data for the appointment.

Processor 40 then determines the location of device 10 (step 84) using, for example, GPS application 44 or another suitable location-determining application. Alternatively, a user may be prompted for or otherwise manually input an alternative location (e.g., in the case of when the user knows he or she will be at another location in the near future, etc.).

Based upon the location data from the appointment and the location of device 10 (or other alternative location provided by the user), processor 40 may then provide advertisement data (step 86), for example, along the driving route between the location of the appointment and the current location of device 10 within a predetermined distance of the location of the appointment and/or the current location of device 10, and so on.

Figure 11:
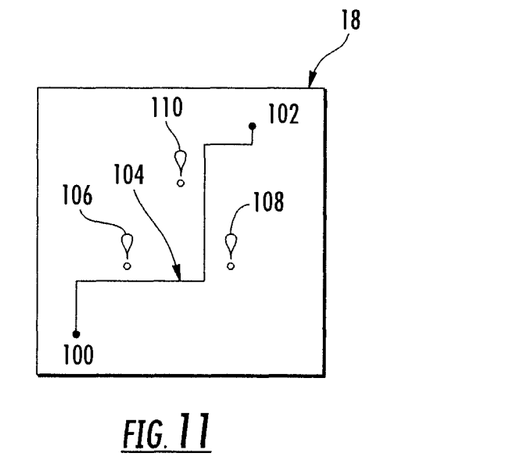

For example, referring to FIGS. 8 and 11, a user may have an appointment (e.g., a sporting event the user wishes to watch such as a baseball game) at a specific time/date at location 102. At a predetermined period of time prior to the appointment (e.g., 4 hours), processor 40 accesses the location data of the appointment (e.g., the location of a baseball stadium, etc.). Processor 40 also determines the current location 100 of device 10. Based upon the current location 100 of device 10 and location 102 of the appointment, processor 40 may then provide advertisement data to device 10 in advance of the appointment based on the current location 100, appointment location 102, time of day, or a combination of these or other factors. Furthermore, processor 40 may provide the advertisement data based upon, for example, a driving route 104 between locations 100, 102. As shown in FIG. 11, one or more icons 106, 108, 110 may be displayed that represent advertisements or advertisement data for various establishments (e.g., restaurants, parking ramps, etc.). Upon selecting one of icons 106, 108, 110, the user may be provided with a larger image (such as image 96 shown in FIG. 10) that includes additional advertisement data.

According to an alternative exemplary embodiment, processor 40 may further take into account user-specific data 48 in conjunction with locations 100, 102 in providing the advertisement data to device 10. For example, processor 40 may filter the types of restaurants on driving route 104 for which advertisement data is provided to device 10. This provides an additional filtering mechanism and increases the relevancy of the advertisement data delivered to the user of device 10. According to various other exemplary embodiments, a wide variety of other user-specific data 48 may be taken into account in providing advertisement data to device 10 in accordance with the embodiments shown in FIGS. 8 and 11.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A mobile computing device comprising:
    a display;
    a memory to store user-specific data, the user-specific data being associated with a plurality of applications;
    a location-determining circuit to determine a current location of the mobile computing device; and
    a processor coupled to the display, the memory, and the location-determining circuit, the processor configured to: (i) automatically access the user-specific data, (ii) determine location information from the accessed user-specific data, and (iii) if the determined location information is within a distance of the current location of the mobile computing device, provide advertisement data on the display based on the current location of the mobile computing device and the determined location information from the accessed user-specific data, wherein the user-specific data comprises data downloaded from a social media account or website.

2. The mobile computing device of claim 1, wherein the processor determines the location information from the accessed user-specific data by analyzing text from content associated with the accessed user-specific data.

3. The mobile computing device of claim 1, wherein the user-specific data includes a telephone number for a telephone call made using the mobile computing device, and wherein the processor determines the location information from the accessed user-specific data by determining an address based on the telephone number.

4. The mobile computing device of claim 1, wherein the advertisement data comprises advertisement data received from a remote advertisement service.

5. A mobile computing device comprising:
    a display;
    a memory to store user-specific data, the user-specific data being associated with a plurality of applications;
    a location-determining circuit to determine a current location of the mobile computing device; and
    a processor coupled to the display, the memory, and the location-determining circuit, the processor configured to: (i) automatically access the user-specific data, (ii) determine location information from the accessed user-specific data, (iii) determine a driving route between the location of the mobile computing device and the determined location information from the accessed user-specific data, and (iv) provide advertisement data on the display based on the current location of the mobile computing device, the determined location information from the accessed user-specific data, and the driving route.

6. The mobile computing device of claim 5, wherein the advertisement data comprises an electronic coupon.

7. The mobile computing device of claim 5, wherein the user-specific data comprises content of an electronic calendar appointment, and wherein the determined location information corresponds to an address corresponding to a meeting location of the electronic calendar appointment.

8. A method of providing advertisement data on a mobile computing device, the method being performed by one or more processors of the mobile computing device and comprising:
determining a current location of the mobile computing device;
accessing user-specific data stored on a memory of the mobile computing device, the user-specific data being associated with one or more applications;
determining location information from the accessed user-specific data; and
if the determined location information is within a distance of the current location of the mobile computing device, providing advertisement data on a display of the mobile computing device based on the current location of the mobile computing device and the determined location information from the accessed user-specific data, wherein the user-specific data comprises data downloaded from a social media account or website.

9. The method of claim 8, further comprising:
receiving the advertisement data from a remote source.

10. The method of claim 8, wherein the user-specific data includes a telephone number for a telephone call made using the mobile computing device, and wherein determining the location information from the accessed user-specific data includes determining an address based on the telephone number.

11. The method of claim 8, further comprising:
providing an audible sound associated with the advertisement data using the mobile computing device.

12. The method of claim 8, wherein the user-specific data comprises content of an electronic calendar appointment, and wherein the determined location information corresponds to an address corresponding to a meeting location of the electronic calendar appointment.

13. A method of providing advertisement data on a mobile computing device, the method being performed by one or more processors of the mobile computing device and comprising:
determining a current location of the mobile computing device;
accessing user-specific data stored on a memory of the mobile computing device, the user-specific data being associated with one or more applications;
determining location information from the accessed user-specific data;
determining a driving route between the current location of the mobile computing device and the determined location information from the accessed user-specific data; and
providing the advertisement data on a display based on the current location of the mobile computing device, the determined location information from the accessed user-specific data, and the driving route.

14. A non-transitory computer-readable medium storing instructions that, when executed by a processor of a mobile computing device, cause the processor to perform operations comprising:
determining a current location of the mobile computing device;
accessing user-specific data stored on a memory of the mobile computing device, the user-specific data being associated with one or more applications;
determining location information from the accessed user-specific data;
determining whether the determined location information is within a distance of the current location of the mobile computing device; and
if the determined location information is within a distance of the current location of the mobile computing device, providing advertisement data on a display of the mobile computing device based on the current location of the mobile computing device and the determined location information from the accessed user-specific data, wherein the user-specific data comprises data downloaded from a social media account or website.

15. The non-transitory computer-readable medium of claim 14, wherein the instructions cause the processor to receive the advertisement data from a remote source.

16. The non-transitory computer-readable medium of claim 14, wherein the user-specific data includes a telephone number for a telephone call made using the mobile computing device, and wherein the instructions cause the processor to determine the location information from the accessed user-specific data by determining an address based on the telephone number.

17. A non-transitory computer-readable medium storing instructions that, when executed by a processor of a mobile computing device, cause the processor to perform operations comprising:
determining a current location of the mobile computing device;
accessing user-specific data stored on a memory of the mobile computing device, the user-specific data being associated with one or more applications;
determining location information from the accessed user-specific data;
determining a driving route between the current location of the mobile computing device and the determined location information from the accessed user-specific data; and
providing the advertisement data on a display based on the current location of the mobile computing device, the determined location information from the accessed user-specific data, and the driving route.

* * * * *